United States Patent Office 3,510,481
Patented May 5, 1970

3,510,481
NAPHTHO- AND BENZOTHIAZINES, THIAZINO-
BENZOTHIAZINES AND THEIR OXIDES
Joseph E. Dunbar and Betty H. Tarnowski, Midland,
Mich., assignors to The Dow Chemical Company, Midland, Mich., a corporation of Delaware
No Drawing. Continuation-in-part of application Ser. No. 640,485, May 23, 1967. This application June 3, 1968, Ser. No. 735,954
Int. Cl. C07d 93/12
U.S. Cl. 260—243                    13 Claims

ABSTRACT OF THE DISCLOSURE

A new series of S-2-(3,4-dihydro-2H-1,4-benzothiazin-4-yl)ethyl substituted thiolsulfonates (I), 2,3-dihydro-4-(2-(substituted sulfonylthio)ethyl)naphtho-(1,2-b) (1,4)-thiazines (II), 2,3,5,6 - tetrahydro - (1,4)-thiazino-(4,3,2-de) (1,4)-benzothiazines (III), and 2,3,5,6-tetrahydro-(1,4)-thiazino-(4,3,2-de) (1,4)-benzothiazine oxides (IV) corresponding to the formulas

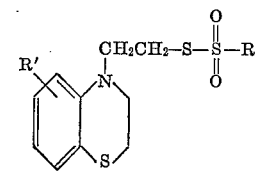

(I)

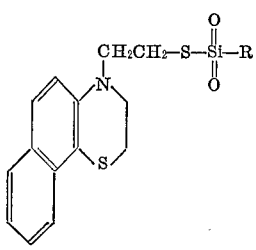

(II)

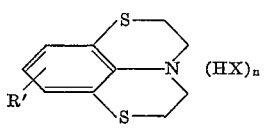

(III)

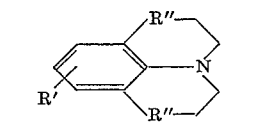

(IV)

and a new method for their production. In said formulas each R represents lower alkyl, phenyl and substituted phenyl; each R' represents methyl, methoxy or hydrogen; one R" represents a sulfinyl (SO) group and the other R" represents a sulfur atom, a sulfinyl (SO) group, or a sulfonyl (SO$_2$) group or both R"(s) represent a sulfonyl (SO$_2$) group; and HX represents hydrogen chloride or hydrogen bromide and $n$ is zero or one. A new method of the present invention comprises dispersing an N,N-bis (2-(substituted sulfonylthio)ethyl)aniline or an N,N-bis (2-(substituted sulfonylthio)ethyl)-2-naphthylamine, or an N,N-bis(2-haloethyl)aniline and a substituted thiosulfonate alkali metal salt or an N,N-bis(2-haloethyl)-2-naphthylamine and a substituted thiosulfonate alkali metal salt in a polar organic solvent and heating the resulting solution to effect ring closure to produce products I, II and III. In another method an S-2-(3,4-dihydro-1,4-benzothiazin-4-yl)ethyl substituted thiolsulfonate (I) is dispersed in a polar organic solvent and the dispersion heated to effect ring closure and the formation of compounds corresponding to formula III. The 2,3,5,6-tetrahydro-(1,4)-thiazino-(4,3,2-de) (1,4)-benzothiazine oxides (IV) are prepared by oxidizing the parent thiazinobenzothiazines. The new compounds of the present invention are useful as pesticides and intermediates.

This is a continuation-in-part of the U.S. patent application which is identified as Ser. No. 640,485, filed May 23, 1967, now abandoned.

The present invention is directed to a series of new S-2-(3,4-dihydro-2H-1,4-benzothiazin-4 - yl)ethyl substituted thiosulfonates and 2,3-dihydro-4-(2-(substituted sulfonylthio)ethyl)naphtho - (1,2-b) (1,4) - thiazines corresponding to the formulas.

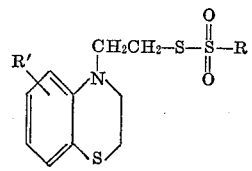

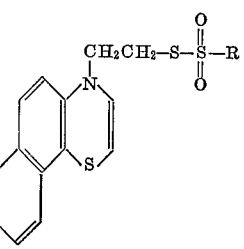

and to a new series of 2,3,5,6-tetrahydro-(1,4)-thiazino-(4,3,2-de) (1,4) - benzothiazines corresponding to the formula

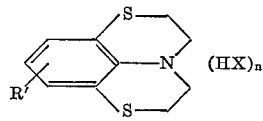

and to a new series of 2,3,5,6-tetrahydro-(1,4-thiazino-(4,3,2-de) (1,4)-benzothiazine oxides corresponding to the formula

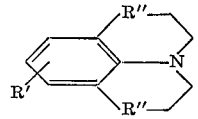

In these and following formulas in the present specification and claims each R' represents a member of the group consisting of hydrogen, methyl and methoxy, each R represents lower alkyl, phenyl, and substituted phenyl, one R" represents a sulfinyl (SO) group and the other R" represents a sulfur atom, a sulfinyl (SO) group, or a sulfonyl (SO$_2$) group or both R"(s) represent a sulfonyl (SO$_2$) group; and HX represents HCl or HBr and $n$ represents one of the integers 0 or 1. As employed in the present specification and claims "lower alkyl" represents an alkyl moiety containing from 1 to 2, to 3, to 4, to 5, to 6 carbon atoms, and "substitued phenyl" represents monomethylphenyl, monohalophenyl, mononitrophenyl and monomethoxyphenyl wherein halo is bromine, chlorine, fluorine and iodine such as chlorophenyl, bromophenyl, and the like.

The new S-2-(3,4-dihydro-2H-1,4-benzothiazin-4-yl) ethyl substituted thiosulfonates (I) will be referred to for the sake of convenience as benzothiazines, the new 2,3,5,6-tetrahydro-(1,4)-thiazino-(4,3,2-de) (1,4)-benzothiazines (III) will be referred to as thiazinobenzothiazines, the new 2,3-dihydro-4-(2-(substitued sulfonylthio)ethyl)

naphtho-(1,2-b)(1,4)-thiazines (II) will be referred to as naphthothiazines, and the new 2,3,5,6-tetrahydro-(1,4)-thiazino-(4,3,2 de) (1,4)-benzothiazine oxides (IV) as thiazinobenzothiazine oxides. The benzothiazines, naphthothiazines, thiazinobenzothiazines, and thiazinobenzothiazine oxides of the present invention are crystalline solid materials which are of low solubility in water and of moderate solubility in many common organic solvents. These materials have been found to be useful as pesticides for the control of various bacteria, fungi and plants. Various of the benzothiazines of the present invention are also useful as intermediates for the production of the new and useful thiazinobenzothiazines which latter compounds are also useful for the production of the new and useful thiazinobenzothiazine oxides as described herein.

The new benzothiazines, except those substituted in the 5-position and thiazinobenzothiazines of the present invention are prepared by a new method which comprises dissolving an N,N-bis(2-(substituted sulfonylthio)ethyl)aniline corresponding to the formula

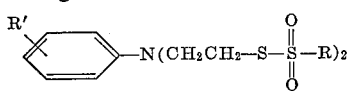

in a polar organic solvent and thereafter heating said solution to effect ring closure.

The reaction proceeds readily at temperatures between 60° and 130° C. and preferably at temperatures between 70° and 100° C. In a convenient procedure, the reaction mixture can be heated at the boiling temperature and under reflux. The temperature of the reaction mixture is maintained within the reaction temperature range for from 1 to about 75 hours depending upon whether a preponderance of the benzothiazine or a preponderance of the thiazinobenzothiazine is desired. The reaction time required for the production of the thiazinobenzothiazine product will vary considerably depending upon such factors as the presence or absence of a substituent on the ring, the type of substituent and the solvent employed as reaction medium. In general, as the polarity of the solvent increases, the reaction time decreases. However, in most cases, after about 40 hours of reaction time, the thiazinobenzothiazine product is the predominant product and there is very little of the benzothiazine product present. The amount of thiazinobenzothiazine present in the reaction mixture at any time during the reaction is determined by the use of standard analytical techniques such as gas-liquid chromatography. Thus, the skilled in the art can determine the amount of thiazinobenzothiazine product in the reaction mixture at any time during the reaction period and can stop the reaction when the desired amount of this product has been formed.

In carrying out one method of the present invention, the N,N-bis(2-(substituted sulfonylthio)ethyl)-aniline is dispersed in a polar organic liquid. Representative polar organic liquids to be employed in the present method as reaction media include ethanol, dimethylformamide, nitromethane, sulfolane and methanol. The amount of polar organic liquid to be employed is not material as long as there is sufficient volume in which to disperse the N,N-bis(2-(substituted sulfonylthio)ethyl)-aniline. Following the dispersion of the starting material in the polar solvent, the reaction mixture thus formed is heated at a temperature within the desired temperature range for at least 1 hour and generally until the desired product mixture, as measured by convenient analytical techniques such as liquid-gas chromatography, is obtained. Following the heating period, the reaction mixture is cooled to terminate the reaction. The cooling of the reaction mixture can be accomplished by any convenient means such as by immersion of the reaction vessel and contents in an ice bath, or by refrigerating the vessel by other means. In some cases, upon cooling, the desired product crystallizes in the cooled reaction mixture from which it is separated by filtration, decantation, or the like. When a water-miscible organic liquid is employed as reaction medium the reaction mixture can be poured on ice or into cold water and the benzothiazine product separated from the aqueous mixture by extraction with an organic solvent such as methylene chloride, chloroform or ethyl ether. Following the extraction procedure, the organic extract is subjected to evaporation in vacuo to remove the low boiling constituents and obtain the product as an oily or solid residue. This product-containing residue is then fractionated by such procedures as chromatography to separate the benzothiazine product from the thiazinobenzothiazine product. In a convenient procedure an acid-washed activated alumina column is employed to separate the benzothiazine product from the thiazinobenzothiazine product.

The new benzothiazines and thiazinobenzothiazines of the present invention can be prepared by an alternative method wherein the N,N-bis(2-(substituted sulfonylthio)ethyl)aniline starting material is produced and then heated in situ to effect the ring closure and obtain the desired product of the present invention. In such alternate methods an N,N-bis(2-haloethyl)aniline compound coresponding to the formula

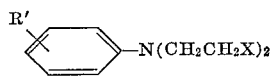

is reacted with a substituted thiosulfonate alkali metal salt corresponding to the formula

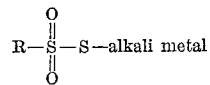

In the present specification and claims, X represents chloro or bromo. The alternate method is carried out in the presence of a polar solvent as reaction medium. The N,N-bis(2-haloethyl)aniline and the substituted thiosulfonate alkali metal salt react together readily at temperatures of from about 60° to 130° C. and preferably at temperatures of from 70° to 100° C. The reaction in going to completion consumes two moles of substituted thiosulfonate metal salt for each mole of N,N-bis-(2-haloethyl)aniline and the use of such proportions is preferred. However, some of the desired product is obtained when the reactants are reacted in any proportions.

In carrying out the alternative method of the present invention, the N,N-bis(2-haloethyl)aniline and the substituted thiosulfonate alkali metal salt are intimately contacted in a polar organic liquid as reaction medium. Operative polar organic liquids are the same as previously described. Following the intimate contacting of the reactants, the temperature of the reaction mixture thus formed is maintained within the reaction temperature range for not more than 15 hours. At the end of the heating period the reaction mixture is cooled and treated as described in the immediately preceding paragraphs in order to obtain the desired benzothiazine product.

Representative N,N-bis(2-haloethyl)anilines include: N,N-bis(2-chloroethyl)-aniline, N,N-bis(2-chloroethyl)-4-methylaniline, N,N-bis(2-bromoethyl)-3-methylaniline, N,N-bis(2-chloroethyl)-4-methoxyaniline, N,N-bis(2-chloroethyl)-4-iodophenylaniline, and N,N-bis(2-bromoethyl) 3-methoxyaniline.

Representative substituted thiosulfonate alkali metal salts include sodium methanethiosulfonate, potassium benzenethiosulfonate, sodium hexanethiosulfonate, potassium propanethiosulfonate, potassium ethanethiosulfonate, sodium p-chlorobenzenethiosulfonate, sodium o-chlorobenzenethiosulfonate, sodium o-toluenethiosulfonate, potassium m-methoxybenzenethiosulfonate, sodium tert.-butanethiosulfonate, sodium p-fluorobenzenethiosulfonate, sodium m-bromobenzenethiosulfonate and sodium p-nitrobenzenethiosulfonate.

In a further procedure, the new thiozinobenzothiazines of the present invention are prepared by a new method which comprises dispersing an S-2-(3,4-dihydro-2H-1,4- benzothiazin-4-yl)ethyl substituted thiosulfonate corresponding to the formula

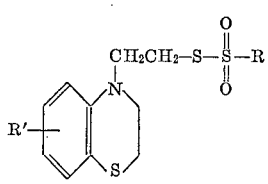

in a polar organic solvent and thereafter, heating the dispersion to effect ring closure.

The ring closure reaction proceeds readily at temperatures between 60° and 130° C. and preferably at temperatures between 70° and 100° C. The temperature of the reaction mixture is maintained within the reaction temperature range for from 1 to about 75 hours, and preferably from about 30 to 50 hours. The reaction is generally carried out under conditions where the surface of the reaction mixture is in contact with the atmosphere, however, the reaction can be carried out in an environment such that the surface of the reaction mixture is in contact with an inert gas such as nitrogen, argon or xenon.

In carrying out the present method of this invention, the S-2-(3,4-dihydro-2H-benzothiazin-4-yl)ethyl substituted thiolsulfonate is dispersed in a polar organic liquid. Representative polar organic liquids to be employed in the present method as reaction media include ethanol, dimethylformamide, nitromethane, sulfolane, acetone and methanol. Following the dispersing of the substituted thiolsulfonate in the polar organic solvent, the resulting reaction mixture is heated at a temperature within the desired temperature range for from 1 to 75 hours. In a convenient procedure, the reaction mixture is heated at the boiling temperature and under reflux. Following the heating period, the reaction mixture is cooled by any convenient means and the thiazinobenzothiazine product isolated as previously described. The benzothiazines containing a substituent in the 7-position are preferred.

The hydrochloride and hydrobromide salts of the thiazinobenzothiazines are prepared by dissolving the appropriate thiazinobenzothiazine in an organic solvent such as methylene chloride, chloroform or 1,1,1-trichloroethane and thereafter treating the solution with excess hydrogen chloride or hydrogen bromide to produce the desired salt. The salt product is separated from the reaction mixture by filtration or by concentration of the reaction mixture to initiate the precipitation of the product. The pricipitated salt product is then isolated by filtration, decantation or centrifugation.

Representative S-2-(3,4-dihydro-2H-1,4-benzothiazin-4-yl)ethyl substituted thiolsulfonates of the present invention which can be employed as starting materials for the thiazinobenzothiazines include:

S-2-(3,4-dihydro-2H-1,4-benzothiazin-4-yl)ethyl methanethiolsulfonate,
S-2-(3,4-dihydro-2H-7-methyl-1,4-benzothiazin-4-yl)ethyl methanethiolsulfonate,
S-2-(3,4-dihydro-2H-6-methoxy-1,4-benzothiazin-4-yl) ethyl methanethiolsulfonate,
S-2-(3,4-dihydro-2H-7-methyl-1,4-benzothiazin-4-yl)ethyl butanethiolsulfonate,
S-2-(3,4-dihydro-2H-1,4-benzothiazin-4-yl)ethyl propanethiolsulfonate,
S-2-(3,4-dihydro-2H-6-methoxy-1,4-benzothiazin-4-yl) ethyl propanethiolsulfonate,
S-2-(3,4-dihydro-2H-1,4-benzothiazin-4-yl)ethyl ethanethiolsulfonate,
S-2-(3,4-dihydro-2H-8-methyl-1,4-benzothiazin-4-yl)ethyl hexanethiolsulfonate,
S-2-(3,4-dihydro-8-methoxy-2H-1,4-benzothiazin-4-yl) ethyl ethanethiolsulfonate,
S-2-(3,4-dihydro-8-methyl-2H-1,4-benzothiazin-4-yl)ethyl propanethiolsulfonate,
S-2-(3,4-dihydro-6-methoxy-2H-1,4-benzothiazin-4-yl) ethyl ethanethiolsulfonate,
S-2-(3,4-dihydro-6-methyl-2H-1,4-benzothiazin-4-yl)ethyl benzenethiolsulfonate,
S-2-(3,4-dihydro-2H-1,4-benzothiazin-4-yl)ethyl benzenethiolsulfonate,
S-2-(3,4-dihydro-2H-1,4-benzothiazin-4-yl)ethyl p-toluenethiolsulfonate,
S-2-(3,4-dihydro-8-methoxy-2H-1,4-benzothiazin-4-yl) ethyl 3-chlorobenzenethiolsulfonate,
S-2-(3,4-dihydro-2H-7-methyl-1,4-benzothiazin-4-yl)ethyl 4-nitrobenzenethiolsulfonate,
S-2-(3,4-dihydro-7-methoxy-2H-1,4-benzothiazin-4-yl) ethyl 3-methoxybenzenethiolsulfonate,
S-2-(3,4-dihydro-8-methyl-2H-1,4-benzothiazin-4-yl)ethyl 2-bromobenzenethiolsulfonate and
S-2-(3,4-dihydro-8-methoxy-2H-1,4-benzothiazin-4-yl) ethyl o-toluenethiolsulfonate.

The 5-substituted benzothiazines of the present invention corresponding to the formula

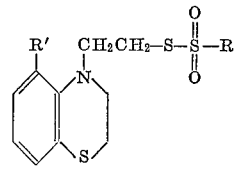

are prepared by dispersing an N,N-bis(2-(substituted sulfonylthio)ethyl)aniline compound corresponding to the formula

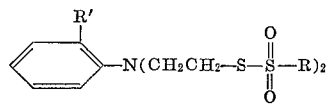

in a polar organic solvent and thereafter heating said dispersion to effect ring closure. The reaction proceeds under the same conditions and the product is separated in the same fashion as previously taught for the ring closure involving compounds corresponding to the formula

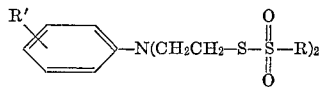

The 2,3-dihydro-4-(2-(substituted sulfonylthio)ethyl)-naphtho-(1,2-b)(1,4)-thiazine compounds of the present invention are prepared by dispersing an N,N-bis-(2-(substituted sulfonylthio)ethyl)-2-naphthylamine in an inert organic solvent and heating the resulting dispersion at a temperature of from 60° to 130° C. for from one to about 20 hours. The organic solvents to be employed, method of carrying out the process and the method of separating the product are all as described for the production of the benzothiazine compounds. The N,N-bis(2-(substituted sulfonylthio)ethyl)-2-naphthylamine compound can be prepared by reacting together an N,N-bis(2-haloethyl)-2-naphthylamine and an alkali metal substituted thiosulfonate as previously defined and corresponding to the formula

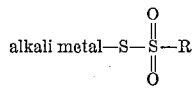

The reaction proceeds in the presence of a polar organic solvent as reaction medium and at temperatures of from about 60° to 130° C. The reaction is carried out in the same manner as previously described for the production of the benzothiazine products of the present invention.

The 2,3,5,6-tetrahydro-(1,4)-thiazino-(4,3,2-de)-(1,4)-benzothiazine oxides (IV) of the present invention are prepared by oxidizing 2,3,5,6-tetrahydro-(1,4)-thiazino-(4,3,2-de)(1,4)-benzothiazine. This is accomplished by use of an oxidizing agent which include, representatively, hydrogen peroxide, peroxymonophthalic acid, peroxymonosulfuric acid, peracetic acid, and perbenzoic acid.

These oxidized products represent four oxidative steps or plateaus. Thus, there can be formed the S-oxide, the S,S'-dioxide, the S,S,S'-trioxide, and the S,S,S',S'-tetraoxide products. Each of these oxidative steps requires one atom of oxygen per molecule of starting compound or, one molecular proportion of 2,3,5,6-tetrahydro-(1,4)-thiazino - (4,3,2-de)(1,4) - genzothiazine is reacted with an amount of oxidizing agent sufficient to supply 1, 2, 3, or 4 gram atoms of oxygen depending upon whether it is desired to introduce 1, 2, 3 or 4 atoms of oxygen in one molecule of 2,3,5,6-tetrahydro - (1,4) - thiazino-(4,3,2-de)(1,4)-benzothiazine. Hence, the thiazinobenzothiazine compound per se requires one atom of oxygen in the preparation of the corresponding thiazinobenzothiazine - S- (mono)-oxide; this, requires a second atom of oxygen or the original thiazinobenzothiazine requires two atoms of oxygen in the preparation of the corresponding thiazinobenzothiazine-S,S'-dioxide. Similarly, the S,S,S'-trioxide products require three and the S,S,S',S'-tetraoxide products require four atoms of oxygen. In carrying out the various oxidation reactions to prepare the compounds of the present invention, it is preferable to employ the oxidizing agent in such amounts as will provide oxygen in the stoichiometric quantities consumed in the particular reaction. In some instances, the use of a slight excess of the oxidizing agent is preferred.

Hydrogen peroxide, and conveniently a solution thereof with glacial acetic acid, is the oxidizing agent of choice in the production of the oxides of the present invention. In a preferred procedure, the glacial acetic acid is employed as the liquid reaction medium for the oxidation with hydrogen peroxide. The reaction takes place at temperatures of from about 30° C. to about 100° C. In a convenient method, the reaction is carried out at between 40° and 80° C. In carrying out the reaction, the reactants are contacted in any order or fashion, and preferably in amounts stoichiometric for the preparation of the desired product. The reaction mixture is then maintained at a temperature within the reaction temperature range for a short period of time. Following the reaction period, the thiazinobenzothiazine oxide product can be precipitated by neutralizing the reaction mixture and the product thereafter separated by conventional procedures such as filtration and recrystallization. The neutralization process which initiates product percipitation is conveniently conducted by the addition of an aqueous base, such as an ammonium hydroxide solution, to the reaction mixture. Alternatively, the product can be recovered by quenching the reaction mixture in ice water and thereafter isolating the resulting solid.

By employing similar procedures and reaction conditions as described above, the other representative oxidizing agents can be employed to prepare the thiazinobenzothiazine oxides hereof. In a preferred procedure, the oxidizing agent is employed in quantities slightly in excess of the theoretical quantities consumed by the reaction in the preparation of the desired product. Conveniently, these reactions are conducted in a liquid medium, a solution of the oxidizing agent in, for example, acetic acid, being satisfactorily used as the transfer medium for this reactant to the reaction mixture.

The following examples are merely illustrative and art not intended to be limiting.

EXAMPLE 1

N,N-bis(2-chloroethyl)aniline (145 grams; 0.665 mole) and potassium methanethiosulfonate (200 grams; 1.33 moles) were dispersed in 4 liters of ethanol. The dispersion thus prepared was heated at the boiling temperature and under reflux with stirring for 43 hours. Upon completion of the heating period, the reaction mixture was filtered to remove the potassium chloride of reaction and the filtrate thus obtained allowed to cool. During the cooling period, a crystalline solid matrial precipitated in the reaction mixture. This crystalline solid material was collected by filtration and recrystallized from ethanol and then recrystallized twice from methanol to give the 2,3,5,6-tetrahydro - (1,4) - thiazino-(4,3,2-de)-(1,4)-benzothiazine product melting at 121.5°–123° C. and having carbon, hydrogen, nitrogen and sulfur contents, as determined by elemental analysis of 57.48, 5.20, 6.59 and 30.63 percent, respectively, as compared to the theoretical contents calculated for $C_{10}H_{11}NS_2$ of 57.38, 5.30, 6.69 and 30.63 percent, respectively.

EXAMPLE 2

N,N - bis(2 - (methylsulfonylthio)ethyl)aniline (3.0 grams; 0.0081 mole) was dispersed in 100 milliliters of ethanol and the resulting dispersion heated at the boiling temperature and under reflux for 45 hours. Following the heating period, the reaction mixture was cooled, whereupon the 2,3,5,6-tetrahydro - (1,4) - thiazino - (4,3,2-de) (1,4)-benzothiazine product precipitated in the reaction mixture as a crystalline solid. This crystalline solid product was collected by filtration and found to melt at 120.5° to 122.5° C. The infrared spectrum of this material was identical to that of the 2,3,5,6-tetrahydro-(1,4)-thiazino-(4,3,2-de)(1,4)-benzothiazine prepared in Example 1.

EXAMPLE 3

N,N - bis(2 - bromoethyl)aniline (7.90 grams; 0.0258 mole) and potassium p-toluenethiosulfonate (11.7 grams; 0.0516 mole) was dispersed in 300 milliliters of ethanol and the resulting dispersion heated at the boiling temperature and under reflux with stirring for 41 hours. Following the reaction period, the reaction mixture was filtered to remove the potassium bromide byproduct and the filtrate concentrated in vacuo to obtain a solid residue. This solid residue was dissolved in ether, the ether solution dried over anhydrous magnesium sulfate and the dried ether solution concentrated in vacuo to obtain a solid residue which was recrystallized from methanol. The recrystallized 2,3,5,6 - tetrahydro - (1,4)-thiazino-(4,3,2-de) (1,4)-benzothiazine product melted at 120°–122° C.

EXAMPLE 4

2,3,5,6 - tetrahydro - (1,4) - thiazino - (4,3,2-de)-(1,4)-benzothiazine (5.0 grams; 0.024 mole) was dissolved in 100 milliliters of methylene chloride. An excess of hydrogen chloride was then bubbled through the methylene chloride solution. Following the addition of the hydrogen chloride the reaction mixture was concentrated in vacuo to obtain a crystalline solid product which was washed with ether. The washed 2,3,5,6-tetrahydro-(1,4)-thiazino-(4,3,2-de) (1,4)-benzothiazine hydrochloride product was found to melt at 161°–163.5° C. and found to have carbon, hydrogen, and nitrogen contents of 48.73, 5.05, and 5.55 percent, respectively, by analysis as compared to the theoretical contents calculated for $C_{10}H_{12}ClNS_2$ of 48.86, 4.92, and 5.70 percent, respectively.

EXAMPLE 5

N,N - bis(2-bromoethyl) - p - toluidine (20.0 grams; 0.0624 mole) and potassium methanethiosulfonate (18.8 grams; 0.125 mole) were dispersed in 600 milliliters of ethanol. The resulting dispersion was heated at the boiling temperature and under reflux in a nitrogen atmosphere for 11 hours. Following the heating period, the hot reaction mixture was filtered to remove potassium bromide byproduct and the filtrate concentrated in vacuo to obtain a liquid residue. This liquid residue was then poured into water and the aqueous mixture extracted with methylene chloride. The methylene chloride extract was dried over anhydrous magnesium sulfate and the dried extract subjected to evaporation in vacuo to obtain an oily residue. This oily residue was chromatographed on an acid-washed activated alumina column and the product eluted using first benzene and then a mixture of benzene and isopropanol (2:1). The solid 2,3,5,6-tetrahydro-9-methyl-(1,4)- thiazino-(4,3,2-de)(1,4)-benzothiazine product was recrystallized from ethanol and the recrystallized product found to melt at 96.5° to 98.5° C. The recrystallized product was found by elemental analysis to have carbon, hydrogen, and nitrogen contents of 59.0, 5.96, and 6.14 percent, respectively, as compared to the theoretical contents calculated for $C_{11}H_{13}NS_2$ of 59.15, 5.87, and 6.27 percent, respectively.

In a similar procedure, 2,3,5,6-tetrahydro-8-methyl-(1,4)-thiazino-(4,3,2-de)(1,4)-benzothiazine melting at 102.5°–103° C. and having carbon, hydrogen and nitrogen contents of 59.16, 5.58 and 6.26 percent, respectively, by analysis as compared to the theoretical contents calculated for $C_{11}H_{13}NS_2$ of 59.15, 5.87, and 6.27 percent, respectively, was prepared by reacting together N,N-bis(2-bromoethyl)-m-toluidine and potassium methanethiosulfonate.

EXAMPLE 6

N,N-bis(2-bromoethyl)-p-anisidine (3.0 grams; 0.0089 mole) and potassium methanethiosulfonate (2.7 grams; 0.018 mole) were dispersed in 30 milliliters of dimethylformamide. The reaction mixture thus prepared was heated on the steam bath for 1.5 hours and the hot reaction mixture poured onto ice to precipitate the product as a solid material. This solid material was then twice recrystallized from ethanol to give a 2,3,5,6-tetrahydro-9-methoxy-(1,4)-thiazino-(4,3,2-de)(1,4)-benzothiazine product melting at 93.0°–93.5° C. The recrystallized product was found, by elemental analysis, to have carbon, hydrogen and sulfur contents of 55.15, 5.38 and 26.51 percent, respectively, as compared to the theoretical contents calculated for $C_{11}H_{13}NOS_2$ of 55.19, 5.47 and 26.79 percent, respectively.

EXAMPLE 7

N,N-bis(2-bromoethyl)-2-naphthylamine (5.0 grams; 0.014 mole) and potassium methanethiosulfonate (4.2 grams; 0.028 mole) were dispersed in 150 milliliters of ethanol. The reaction mixture thus prepared was heated at the boiling temperature and under reflux for 3 hours. Following the heating period, the reaction mixture was filtered to remove the potassium bromide and the filtrate thus obtained cooled. During the cooling period, the crystalline solid 2,3-dihydro-4-(2-(methylsulfonylthio)ethyl)naptho-(1,2-b)(1,4)-thiazine product precipitated in the reaction mixture. This product was recrystallized first from petroleum ether and then from ethanol to give colorless crystals of 2,3-dihydro-4-(2-(methylsulfonylthio)ethyl)naphthio-(1,2-b)(1,4)-thiazine product melting at 129°–130° C. and having carbon, hydrogen, nitrogen and sulfur contents of 52.5, 5.18, 3.78 and 28.04 percent, respectively, by analysis as compared with the theoretical contents calculated for $C_{15}H_{17}NO_2S_3$ of 53.06, 5.05, 4.13 and 28.33 percent, respectively.

The following compounds of the present invention are prepared in a similar fashion.

2,3-dihydro-4-(2-(phenylsulfonylthio)ethyl)-naphtho-(1,2-b)(1,4)-thiazine (molecular weight 401.6) by reacting together N,N-bis(2-chloroethyl)-2-naphthylamine and potassium benzenethiosulfonate.

2,3-dihydro-4-(2-(butylsulfonylthio)ethyl)-naphtho-(1,2-b)(1,4)-thiazine (molecular weight 381.6) by heating N,N-bis(2-(butylsulfonylthio)ethyl)-2-naphthylamine in acetone as reaction medium.

2,3-dihydro-4-(2-(isopropylsulfonylthio)-ethyl) naphtho-(1,2-b)(1,4)-thiazine (molecular weight 367.6) by reacting together N,N-bis(2-chloroethyl)-2-naphthylamine and potassium 1-methylethanethiosulfonate.

EXAMPLE 8

N,N-bis(2-chloroethyl)aniline (10.0 grams; 0.0458 mole) and potassium methanethiosulfonate (13.8 grams; 0.0920 mole) were dispersed in 50 milliliters of dimethylformamide and the resulting dispersion heated on the steam bath for 9 hours. Following the heating period, the hot reaction mixture was poured onto ice and the resulting aqueous mixture extracted with methylene chloride. The methylene chloride extract was dried over anhydrous magnesium sulfate and concentrated in vacuo to give an oily residue. This oily residue was then chromatographed on a column of acid-washed activated alumina. A mixture of benzene and isopropanol (3:1) was employed to elute the S-2-(3,4-dihydro-2H-1,4-benzothiazin-4-yl)ethyl methanethiosulfonate product. The eluent was then evaporated to dryness to obtain the product as a crystalline residue. This product upon recrystallization from methanol melted at 105°–107.5° C. and was found to have carbon, hydrogen, nitrogen and sulfur contents of 45.92, 5.38, 4.55 and 33.32 percent, respectively, as compared to the theoretical contents calculated for $C_{11}H_{15}NO_2S_3$ of 45.65, 5.22, 4.84 and 33.23 percent, respectively.

In a similar method the following compounds of the present invention are prepared.

S-2-(3,4-dihydro-2H-1,4-benzothiazin-4-yl)-ethyl ethanethiolsulfonate (molecular weight 303.5) by heating N,N-bis(2-ethylsulfonylthio)ethyl)aniline in ethanol as reaction medium.

S-2-(3,4-dihydro-7-methoxy-2H-1,4-benzothiazin-4-yl) ethyl n-butanethiolsulfonate (molecular weight 361.6) by heating N,N-bis(2-(n-butylsulfonylthio)ethyl)-4-methoxyaniline in acetone as reaction medium.

S-2-(3,4-dihydro-7-methoxy-2H-1,4-benzothiazin-4-yl)ethyl 1-methylethanethiolsulfonate (molecular weight 347.5) by heating N,N-bis(2-(isopropylsulfonylthio)ethyl)-4-methoxyaniline in methanol as reaction medium.

S-2-(3,4-dihydro-7-methyl-2H-1,4-benzothiazin-4-yl) ethyl 1-methylethanethiolsulfonate (molecular weight 331.5) by heating N,N-bis(2-(isopropylsulfonylthio)ethyl)-4-methylaniline in sulfolane as reaction medium.

S-2-(3,4-dihydro-7-methoxy-2H-1,4-benzothiazin-4-yl)ethyl 1-methylethanethiolsulfonate (molecular weight 319.5) by heating N,N-bis(2-(methylsulfonylthio)ethyl)-4-methoxyaniline in nitromethane as reaction medium.

S-2-(3,4-dihydro-2H-1,4-benzothiazin-4-yl)-ethyl hexanethiolsulfonate (molecular weight 359.6) by heating N,N-bis(2-(hexylsulfonylthio)ethyl)aniline in dimethylformamide as the reaction medium.

S-2-(3,4-dihydro-2H-1,4-benzothiazin-4-yl)-ethyl tert.-butanethiolsulfonate (molecular weight 331.5) by reacting together N,N-bis(2-bromoethyl)aniline and potassium tert.butanethiosulfonate.

EXAMPLE 9

S-2-(3,4-dihydro-2H-1,4-benzothiazin-4-yl)-ethyl methanethiolsulfonate (145 grams– 0.5 mole) is dispersed in 500 milliliters of nitromethane and the resulting dispersion heated at the boiling temperature and under reflux for 30 hours. Following the heating period the reaction mixture is allowed to cool and the cooled reaction mixture is concentrated in vacuo to initiate the crystallization of the product. The crystalline solid 2,3,5,6-tetrahydro-(1,4)-thiazino-(4,3,2-de)(1,4)-benzothiazine product, which precipitates during the concentration procedure, is separated by filtration, recrystallized from methanol and analyzed by infrared and proton magnetic spectroscopy.

In a similar process the following compounds of the present invention are prepared.

2,3,5,6-tetrahydro-9-methyl-(1,4)-thiazino-(4,3,2-de)(1,4)-benzothiazine (melting point 96°–98° C.) by heating S-2-(3,4-dihydro-7-methyl-2H-1,4-benzothiazin-4-yl)ethyl benzenethiolsulfonate in sulfolane as reaction medium.

2,3,5,6-tetrahydro-8-methoxy-(1,4)-thiazino-(4,3,2-de)(1,4)-benzothiazine (molecular weight 239.34) by heating S-2-(3,4-dihydro-6-methoxy-2H-1,4-benzothiazin-4-yl)ethyl p-chlorobenzenethiolsulfonate in acetone as reaction medium.

2,3,5,6-tetrahydro-8-methyl-(1,4)-thiazino-(4,3,2-de)(1,4)-benzothiazine (melting points 102°–103°

C.) by heating S-2-(3,4-dihydro-6-methyl-2H-1,4-benzothiazin-4-yl)ethyl hexanethiolsulfonate in dimethylformamide as reaction medium.

EXAMPLE 10

A solution of 10 grams (0.048 mole) of 2,3,5,6-tetrahydro-(1,4)-thiazino-(4,3,2 - de)(1,4 - benzothiazine was dispersed in 200 milliliters of glacial acetic acid and this solution warmed to 60° C. with stirring. To this warmed solution was added, dropwise, a solution of 22.8 grams of 30 percent aqueous hydrogen peroxide (0.20 mole of hydrogen peroxide) dissolved in 50 milliliters of glacial acetic acid. This addition was carried out at a rate such that the temperature of the reaction mixture did not exceed 65° C. After such addition, the reaction mixture was stirred at 60° C. for 17 hours and then poured into 200 milliliters of ice water. The resultant mixture was neutralized by the addition of ammonium hydroxide resulting in the precipitation of a mustard colored solid which was collected by filtration. The aqueous filtrate was extracted with chloroform and the chloroform extract was dried over anhydrous magnesium sulfate. Evaporation of the solvent provided additional solid. The two solids were combined and extracted with hot acetonitrile, and the hot acetonitrile solution was decanted from some insoluble gummy solid. The acetonitrile was removed by evaporation in vacuo, providing a yellow crystalline product. Two recrystallizations from an acetone-petroleum ether (60°–70° C.) solution gave the desired 2,3,5,6-tetrahydro - (1,4) - thiazino - (4,3,2 - de)(1,4) - benzothiazine-1,1,7,7-tetraoxide product as a yellow crystalline solid having a melting point of 224.5°–227.0° C. and which was found to have carbon, hydrogen, and nitrogen contents of 44.25, 4.24 and 5.17 percent, respectively, as compared to the theoretical contents calculated for $C_{10}H_{11}NO_4S_2$ of 43.94, 4.06 and 5.13 percent, respectively.

EXAMPLE 11

2,3,5,6 - tetrahydro - 9 - methyl - (1,4) - thiazino-(4,3,2-de)(1,4-benzothiazine (5.0 grams; 0.022 mole) is dispersed in 100 milliliters of glacial acetic acid. To the resultant solution is added with stirring and in a dropwise fashion a solution of 2.5 grams of 30 percent hydrogen (peroxide (0.022 mole of hydrogen peroxide) in 25 milliliters of glacial acetic acid. The reaction mixture is stirred at 60° C. for about 15 hours and is then poured into ice water. Neutralization with ammonium hydroxide causes the precipitation of a solid which is collected by filtration and then dissolved in methylene chloride. The resultant solution is dried over anhydrous magnesium sulfate and evaporated in vacuum leaving a crystalline solid material. The aqueous filtrate remaining after filtration is extracted with methylene chloride and the extract treated in a manner similar to that described above, giving an additional crop of solid material. The two solid crops are combined and recrystallized from benzene to give the desired 2,3,5,6-tetrahydro-9-methyl-(1,4)-thiazino-(4,3,2-de)(1,4)-benzothiazine-1-oxide product. 2,3,5,6 - tetrahydro - 9 - methyl - (1,4) - thiazino - (4,3,2-de)(1,4)-benzothiazine-1-oxide has a molecular weight of 239.3.

In accordance with the foregoing procedures of the present invention, the following are prepared.

2,3,5,6-tetrahydro - 9 - methoxy - (1,4) - thiazino-(4,3,2-de)(1,4)-benzothiazine-1-oxide which has a molecular weight of 255.3 by treating 2,3,5,6-tetrahydro-9-methoxy - (1,4) - thiazino - (4,3,2-de)(1,4) - benzothiazine with one mole of hydrogen peroxide per mole of starting compound.

2,3,5,6 - tetrahydro - (1,4) - thiazino - (4,3,2 - de)-(1,4)-benzothiazine-1,1,7-trioxide which has a molecular weight of 257.3 by treating 2,3,5,6-tetrahydro-(1,4)-thiazino-(4,3,2-de)(1,4)-benzothiazine with three moles of hydrogen peroxide per mole of starting compound.

2,3,5,6 - tetrahydro - 8 - methoxy - (1,4) - thiazino-(4,3,2-de)(1,4)-benzothiazine-1-oxide and 2,3,5,6-tetrahydro - 8 - methoxy - (1,4) - thiazino - (4,3,2 - de)(1,4)-benzothiazine-7-oxide which each have a molecular weight of 255.3 by treating 2,3,5,6-tetrahydro-8-methoxy-(1,4)-thiazino-(4,3,2-de)(1,4)-benzothiazine with one mole of hydrogen peroxide per mole of starting compound.

The new compounds of the present invention are useful as herbicides and pesticides for the control of a number of bacteria, fungi, insects and plants. For such uses the unmodified compounds can be employed. The product can also be dispersed on a finely divided solid and employed as a dust. Also, such mixtures can be dispersed in water with or without the aid of a surface-active dispersing agent and the resulting aqueous suspension employed as a spray, drench, or wash. In other procedures, the products are employed as the toxic constituents in solvent solutions, oil-in-water or water-in-oil emulsions or aqueous dispersions. Good results are obtained when employing compositions containing from 50 to 10,000 parts per million of one or more of the compounds.

In representative operations, 2,3,5,6-tetrahydro-(1,4)-thiazino-(4,3,2-de)(1,4)-benzothiazine and 2,3,5,6-tetrahydro-9-methoxy-(1,4) - thiazino-(4,3,2-de)(1,4)-benzothiazine each when employed in aqueous compositions at a concentration of 500 parts per million give substantially complete control of *Phytophthora infestans*, the causative agent of potato late blight. In other operations, 2,3,5,6-tetrahydro-9-methyl-(1,4) - thiazino - (4,3,2-de)-(1,4)-benzothiazine gives substantially complete control of bean mildew when employed as the sole toxic constituent in aqueous compositions and at a concentration of 4,000 parts per million. In still further operations, S-2-(3,4-dihydro-2H - 1,4 - benzothiazin-4-yl)ethyl methanethiolsulfonate and 2,3,5,6-tetrahydro - (1,4) - thiazino-(4,3,2-de)(1,4)-benzothiazine - 1,1,7,7 - tetraoxide when each added, as the sole toxic constituent to the microbial growth medium at a concentration of 500 parts per million by weight, gives complete inhibition of the growth of *Bacillus subtilis, Staphylococcus aureus, Aspergillus tereus, Candida pelliculosa* and *Pullularia pullulans*.

In a further representative operation, 2,3,5,6-tetrahydro - (1,4) - thiazino - (4,3,2 - de)(1,4) - benzothiazine-1,1,7,7-tetraoxide give good controls and kills of the American cockroach when this organism is contacted with a composition containing 1000 parts of the thiazinobenzothiazine oxide per million by weight.

The N,N-bis(2-(substituted sulfonylthio)ethyl)-aniline compounds employed as starting materials and corresponding to the formula

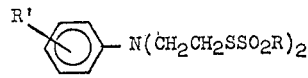

are prepared by reacting a dihalo compound corresponding to the formula

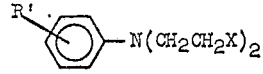

with an alkali metal salt of a thiosulfonic acid corresponding to the formula

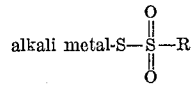

The reaction proceeds readily in an organic liquid such as acetone, ethanol, methanol, aqueous methanol, aqueous acetone and aqueous ethanol. The reaction proceeds readily at temperatures of from 60° to 120° C. and preferably at the boiling temperature of the reaction mixture. Following the reaction period, the reaction mixture is filtered to remove the inorganic halide of reaction and the filtrate thereafter cooled. During the cooling procedure the desired product precipitates as a crystalline solid or as an oil. The product can then be isolated by centrifugation, decantation or filtration and employed as a starting material in accordance with the teachings of this specification or be further purified by conventional procedures before being so employed.

We claim:
1. A compound corresponding to one of the formulas

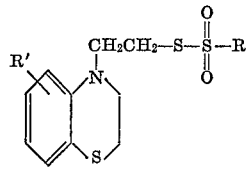

(I)

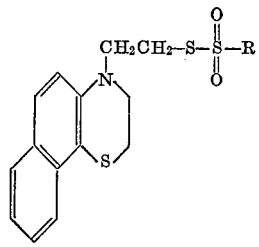

(II)

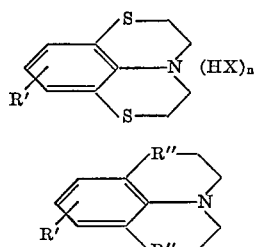

(III)

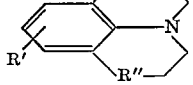

(IV)

wherein each R represents lower alkyl, phenyl, monomethylphenyl, monomethoxyphenyl, monohalophenyl, or mononitrophenyl, each R' represents hydrogen, methyl, or methoxy, one R" represents a sulfinyl (SO) group and the other R" represents a sulfur atom, a sulfinyl (SO) group, or a sulfonyl ($SO_2$) group or both R"(s) represent a sulfonyl ($SO_2$) group, and HX represents hydrogen chloride or hydrogen bromide and $n$ represents the integer 0 or 1.

2. A compound claimed in claim 1 wherein the compound corresponds to the formula

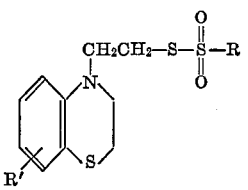

wherein R represents lower alkyl, phenyl, monomethylphenyl, monomethoxyphenyl, monohalophenyl, or mononitrophenyl, and R' represents hydrogen, methyl or methoxy.

3. A compound claimed in claim 1 wherein the compound corresponds to the formula

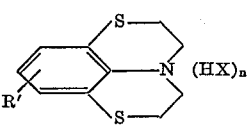

wherein R' represents hydrogen, methyl or methoxy, HX represents hydrogen chloride or hydrogen bromide and $n$ represents the integer 0 or 1.

4. The compound claimed in claim 1 which is 2,3,5,6-tetrahydro-(1,4)-thiazino - (4,3,2-de)(1,4)-benzothiazine.

5. The compound claimed in claim 1 which is S-2-(3,4-dihydro - 2H-1,4 - benzothiazin-4-yl)ethyl methanethiosulfonate.

6. The compound claimed in claim 1 which is 2,3,5,6-tetrahydro-9-methoxy - (1,4) - thiazino-(4,3,2-de)-(1,4)-benzothiazine.

7. The compound claimed in claim 1 which is 2,3,5,6-tetrahydro-9-methyl - (1,4) - thiazino - (4,3,2-de) - (1,4)-benzothiazine.

8. The compound claimed in claim 1 which is 2,3,5,6-tetrahydro - (1,4) - thiazino - (4,3,2-de)(1,4) - benzothiazine-1,1,7,7-tetraoxide.

9. The method claimed in claim 11 wherein the N,N-bis-(2-(substituted sulfonylthio)ethyl)aniline is N,N-bis(2-(methylsulfonylthio)ethyl)aniline.

10. The method of claimed in claim 12 wherein the S-2-(3,4-dihydro - 2H - 1,4 - benzothiazin-4-yl)ethyl substituted thiolsulfonate corresponds to the formula

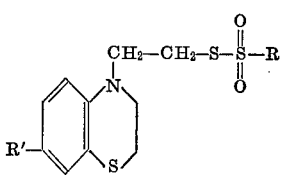

11. A method for the preparation of benzothiazine compounds corresponding to the formula

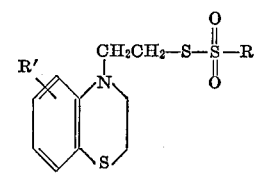

wherein R is loweralkyl, monomethylphenyl, monomethoxyphenyl, monohalophenyl, or mononitrophenyl and R' is hydrogen, methyl, or methoxy, which comprises heating an N,N-bis(2-(substituted sulfonylthio)ethyl)aniline compound in a polar organic solvent at a temperature of from about 60° to about 130° C., said aniline compound corresponding to the formula

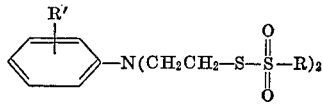

wherein R and R' are as defined for the benzothiazine compound.

12. A method for the preparation of thiazinobenzothiazine compounds corresponding to the formula

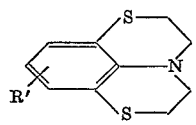

wherein R' is hydrogen, methyl or methoxy, which comprises:
(a) dispersing in a polar solvent, an S-2-(3,4-dihydro-2H - 1,4 - benzothiazin-4-yl)ethyl substituted thiolsulfonate corresponding to the formula

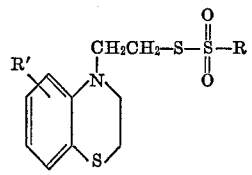

wherein R is loweralkyl, phenyl, monomethylphenyl, monomethoxyphenyl, monohalophenyl, or mononitrophenyl and R' is hydrogen, methyl or methoxy, and (b) heating the resulting dispersion at a temperature of from about 60° to 130° C.

13. A method for the preparation of 2,3-dihydro-4-(2-(substituted sulfonylthio)ethyl)naphtha - (1,2-b) - (1,4)-thiazine compounds corresponding to the formula

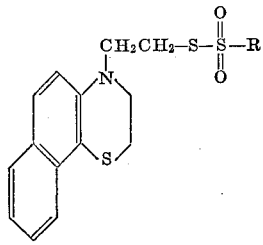

wherein R is loweralkyl, phenyl monomethylphenyl, monomethoxyphenyl, monohalophenyl, or mononitrophenyl, which comprises:

(a) dispersing in a polar organic solvent an N,N-bis-(2-(substituted sulfonylthio)ethyl) - 2 - naphthylamine corresponding to the formula

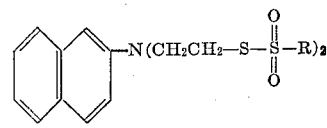

wherein R is loweralkyl, phenyl, monomethylphenyl, monomethoxyphenyl, monohalophenyl, or mononitrophenyl, and (b) heating the dispersion at a temperature of from about 60° to 130° C.

References Cited

UNITED STATES PATENTS

| 2,947,744 | 8/1960 | Lowrie | 260—243 |
| 3,042,671 | 7/1962 | Lombardino et al. | 260—243 |
| 3,148,188 | 9/1964 | Hoya | 260—243 |

HENRY R. JILES, Primary Examiner

J. M. FORD, Assistant Examiner

U.S. Cl. X.R.

260—456, 999

UNITED STATES PATENT AND TRADEMARK OFFICE
CERTIFICATE OF CORRECTION

PATENT NO. : 3,510,481
DATED : May 5, 1970
INVENTOR(S) : Joseph E. Dunbar and Betty H. Tarnowski It is certified that error appears in the above-identified patent and that said Letters Patent are hereby corrected as shown below:

Column 1, in Formula II, "Si" should read --S--;

Column 2, line 14, "formulas." should read --formulas--;

Column 2, second formula, in the hetero nitrogen-sulfur moiety the double bond on the right side should be a single bond;

Column 2, line 42, "tetrahydro-(1,4-thiazino-" should read --tetrahydro-(1,4)-thiazino- --;

Column 3, line 3, "(4,3,2 de)" should read --4,3,2-de)--;

Column 3, line 33, "pro-" should read --pre- --;

Column 4, line 41, "substituted thiosulfonate metal" should read --substituted thiosulfonate alkali metal--;

Column 4, line 73, "thiozinobenzothiazines" should read --thiazinobenzothiazines--;

Column 5, line 26, "dihydro-2H-benzothiazin" should read --dihydro-2H-1,4-benzothiazin--;

Column 5, line 49, "uct. The pricipitated" should read --uct. The precipitated--;

Column 7, line 8, "genzothiazine" should read --benzothiazine--;

Column 7, line 46, "percipitation" should read --precipitation--;

Column 7, line 75, "matrial" should read --material--;

UNITED STATES PATENT AND TRADEMARK OFFICE
CERTIFICATE OF CORRECTION

PATENT NO. : 3,510,481
DATED : May 5, 1970
INVENTOR(S) : Joseph E. Dunbar and Betty H. Tarnowski It is certified that error appears in the above-identified patent and that said Letters Patent are hereby corrected as shown below:

Column 9, line 50, "ethyl)naphthio-" should read --ethyl)naphtho- --;

Column 10, line 37, "yl)ethyl 1-methylethanethiolsulfonate" should read --yl)ethyl methanethiosulfonate--;

Column 10, line 56, "ture is concentrated" should read --ture concentrated--;

Column 10, line 75, "points" should read --point--;

Column 11, line 6, "thiazino-(4,3,2-de)(1,4-benzothiazine" should read --thiazino-(4,3,2-de)(1,4)-benzothiazine--;

Column 11, line 40, "(4,3,2-de)(1,4-benzothiazine" should read --(4,3,2-de)(1,4)-benzothiazine--;

Column 11, line 44, "gen (peroxide" should read --gen peroxide--;

Column 14, line 16, "method of claimed" should read --method claimed--;

Column 14, line 39, "loweralkyl, monomethylphenyl," should read --loweralkyl, phenyl, monomethylphenyl,--;

Column 15, line 23, "loweralkyl, phenyl monomethylphenyl," should read --loweralkyl, phenyl, monomethylphenyl,--.

Signed and Sealed this

Sixth Day of July 1976

[SEAL]

Attest:

RUTH C. MASON
Attesting Officer

C. MARSHALL DANN
Commissioner of Patents and Trademarks